United States Patent Office 3,304,358
Patented Feb. 14, 1967

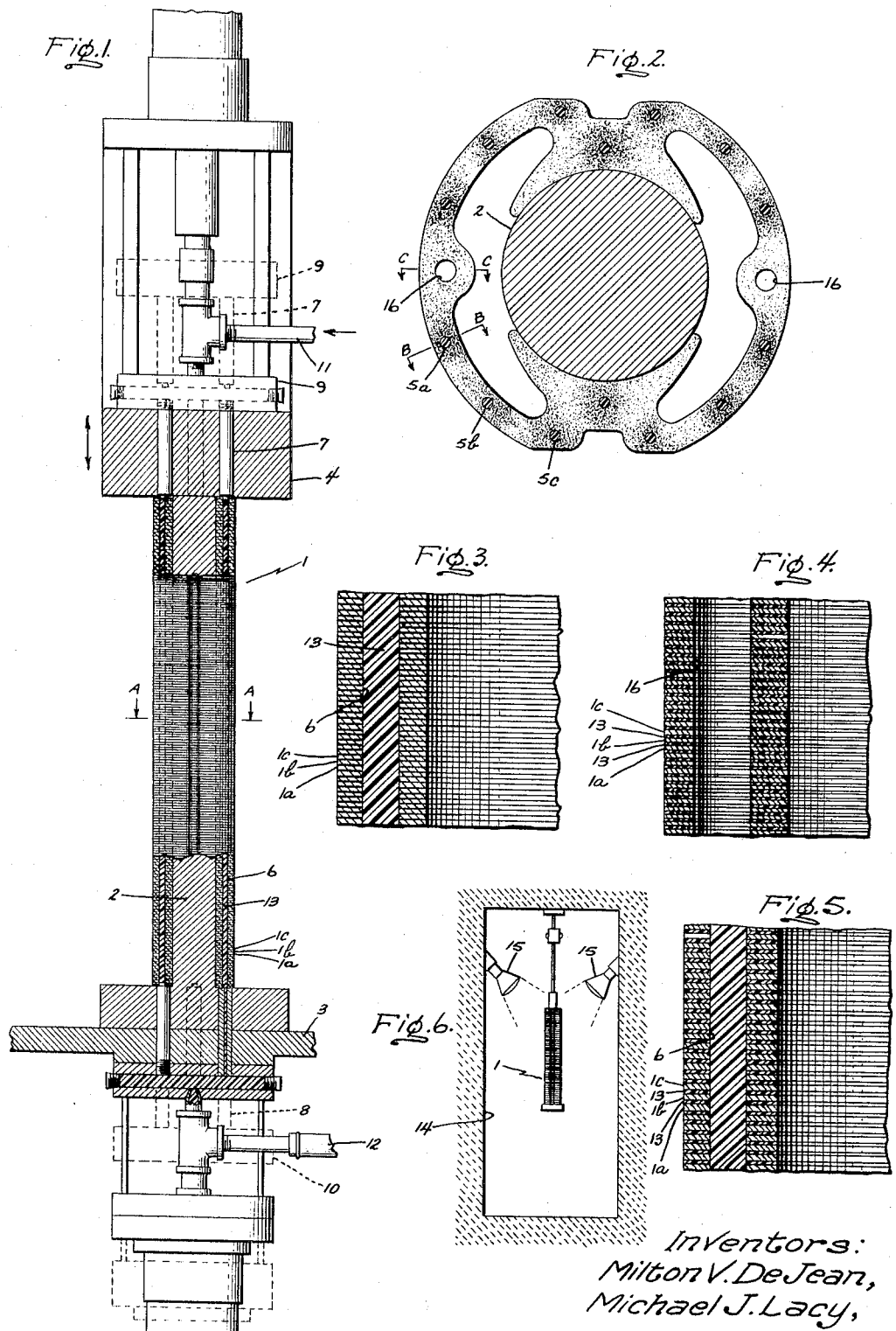

3,304,358
METHOD OF ASSEMBLING AND BONDING TOGETHER LAMINATIONS TO FORM LAMINATED CORES FOR ELECTRICAL INDUCTIVE DEVICES
Milton V. De Jean, Fort Wayne, Ind., and Michael J. Lacy, Florissant, Mo., assignors to General Electric Company, a corporation of New York
Continuation of application Ser. No. 785,061, Jan. 5, 1959. This application Oct. 28, 1963, Ser. No. 320,255
3 Claims. (Cl. 264—159)

This invention relates to a method of constructing cores, and more particularly to a method of assembling and bonding together laminations to form laminated cores of electric inductive devices, such as, dynamoelectric machines. This application is a continuation of our copending application Serial Number 785,061, filed January 5, 1959, and now abandoned.

Dynamoelectric machines, i.e., motors and generators, conventionally includes a stator core member and a rotor core member concentrically disposed within the stator member, at least one and frequently both of the members having a plurality of windings thereon. These core members are conventionally formed of a plurality of relatively thin laminations punched from magnetic steel. The number of laminations comprising the core conventionally have been selected by weight or by mechanical metering devices. Such a stack of laminations is then assembled and held together by welding, riveting, keying, or bonding the core with bonding material between the laminations. It is, of course, desirable to bond such laminated core structures together into a solid unitary piece without the use of welds, rivets, keys, or the coating of the laminations with bonding material between the laminations.

It is further desirable to eliminate the complex keying and riveting machines necessary to perform the respective functions and to eliminate the lamination stack sizing or selecting machines heretofore employed and to provide a simple means for readily sizing or selecting the laminated stacks in production.

It is an object of this invention to provide an improved method of assembling and bonding laminations together to form laminated cores for electrical inductive devices.

Another object of this invention is to provide an improved method of producing laminated cores which permits the formation of cores with the desired stack length from a relatively long stack of laminations already secured together.

Another object of the invention is to provide an improved method for assembling together laminated cores.

According to one form of the invention, which now forms the subject of our copending division application, a stack of core laminations, having winding accommodating means and aligned holes spaced from such means, are securely held together by a cured adhesive or resinous material such as a thixotropic heat curable, thermosetting epoxy resin, in a passageway extending through the stack of laminations. Some of the resin may be drawn by capillary action or forced under pressure between the laminations in the area of the holes. Under such conditions, the resin remaining in the hole may or may not be removed so that a "plastic" rivet may or may not remain in the hole. During curing of the resin, there is a secondary flow characteristic of the resin which results in the resin having a low viscosity, and thus the resin penetrates more freely into the laminations. Upon curing of the resin, the core is firmly bound together by (1) a plastic (or cured resinous) rivet extending through a hole or opening in the core, or (2) plastic material disposed between the laminations in the area of and surrounding the holes, or (3) a combination of these.

The above described core may be readily produced by the improved method of the present invention. In accordance with one form of the method, curable resin, such as, the aforementioned heat curable epoxy resin, is first introduced, under pressure if desired, through the holes or passageways in the stack of core laminations held together. The resinous material may be drawn (as by capillary action), or forced under pressure, between the laminations in the area of the passageway. If the resin is permitted to deposit in one of the aforesaid manners, between the laminations, the resinous material remaining in the passageways may, if desired, but need not necessarily, be removed from the passageways. The resin is cured, as, for example, by heating the stack (in the case of heat curable resin) to cure the resin. The stack may be assembled, if desired, but not necessarily, in a relatively long length and the individual stack heights may be selected by dividing the stacks at the desired points as, for example, by slicing.

The invention together with additional objects and advantages thereof will be best understood from the following description of a specific embodiment, when read in connection with the accompanying drawing, in which:

FIG. 1 is an elevation view, partly in section, illustrating one method of introducing resinous material into openings in the core laminations;

FIG. 2 is a cross section through the stack of core laminations taken along plane A—A of FIG. 1 and illustrating in plan view a typical core lamination;

FIG. 3 illustrates a partial elevation view, in section, of a portion of a stack of core laminations taken along plane B—B of FIG. 2 and illustrating a plastic rivet in an opening to the core laminations;

FIG. 4 is a partial elevation view, in section, taken along plane C—C of FIG. 2, illustrating an embodiment of the instant invention wherein the laminations are bound together by plastic material between the laminations;

FIG. 5 is a partial elevation view, in section, of a passageway in a stack of core laminations wherein the laminations are secured together by both a plastic rivet and plastic material having been deposited between the laminations; and FIG. 6 illustrates schematically a method of baking the core structure to set the resin.

Referring to FIG. 1, there is illustrated the introduction of the resinous material into passageways formed of holes in a stack of laminations. The core laminations 1a, 1b, 1c, etc., are stacked on a mandrel 2 for orientation, thereby forming the lamination stack shown generally as 1. The stack may be of the desired height; or, in the alternative, it may be of a height many times that needed to form the desired single core member and the proper stack height may later be selected as hereinafter explained. The stacked laminations are then placed in a holding device, for example, between the stationary frame 3 and movable frame 4 which are brought together to securely hold the laminations 1 and mandrel 2. As more clearly seen in FIG. 2, the core laminations contain a plurality of holes 5a, 5b, 5c, etc., which are so aligned on the mandrel that passageways 6 are provided through the finished core. Suitable openings through conduit 7, 8 are aligned with passageways 6 of the core laminations by the movement of members 9 and 10 from the position shown in phantom in FIG. 1 to the position shown in solid lines in FIG. 1. Resin, such as the aforementioned epoxy resin, may then be introduced through inlet conduit 11 which connects with an opening in the manifold 9, which opening is, in turn, in communication with the openings in conduits 7. Similarly, the air can be removed from the passageways 6 through the openings in conduits 8, manifold 10, and exhaust conduit 12. There is a natural tendency for the resin to be drawn between the laminations due to capillary action; the stack of laminations forming a sort of wick for the resin. The material 13 may, however, if desired, be injected into the passageways 6 with sufficient pressure to assist or force the material to deposit or penetrate between the laminations.

The stack of laminations is then heated or baked to cure the resin, as, for example, in the oven 14, FIG. 6, by the heat lamps 15. In the event that the resinous material is the above mentioned epoxy resin, the stack may be baked, for example, for about 15 minutes at a temperature of about 150° C. This is left in the passageways 6, as best seen in FIG. 3, a plastic rivet 13 which retains the core laminations. In addition to the plastic rivet 13 as indicated in FIG. 3, if the resin is injected into the passageways 6 with sufficient force to cause the material to penetrate between the laminations or if the resin is otherwise permitted to deposit between the laminations, the laminations may thereby be further bound together. Such a modification is hereinafter explained is discussing FIG. 5 below.

It is not necessary to provide the laminations with special holes 5a, 5b, 5c, etc., for bonding, since the laminations frequently include holes 16 for through bolts (and other purposes) which attach the outer end shields (not shown) to the core. Besides the through bolt holes, if the core is a stator for a dynamoelectric machine of the salient pole type, the laminations will also generally include winding pin holes for the inserting of winding pins used to retain the stator windings in such machines; however, it will be understood that other types of machines may not contain winding pin holes. Such bolt holes, or winding pin holes, or such other holes that may be provided, may be utilized in place of the special rivet holes discussed above. The lamination stack 1 is placed on the mandrel 2 and held in place on the frames 3, 4 as above. The resinous material is now introduced into the holes preferably under a pressure sufficient to force the resinous material to penetrate between the laminations. While it is understood that there is a tendency for the resinous material to be drawn between the laminations due to capillary action a sufficient pressure will materially assist in depositing the resin more satisfactorily. A pressure in the range of 60 lbs. per sq. in. to 1000 lbs. per sq. in. appears satisfactory. The resinous material then penetrates and is deposited between the adjacent laminations and forms a layer between them. Once the penetration has been completed, the pressure can be released and air blown through the holes to clear the holes of excess material; layers of material still remain between the laminations. In this manner, the holes may then be used for their primary function, such as through bolts, winding pins, or the like. The core is then baked as above in the oven 14 and the layers of hardened resinous material disposed between the laminations surrounding the holes will hold the core firmly together. As illustrated in FIG. 4, in the area of the bolt hole 16 the stack consists of alternate layers 1a, 1b, 1c, of laminations and bonding material 13. Thus, each lamination is stuck to the ones adjacent to it without plastic rivets holding the stack together as in the above first described modification.

While in the above preceding modification, the laminations are held together by plastic material between the laminations in the area of the passageway or hole 16, it is not necessary that the excess material be blown from the passageway 16; the core in that area will then be held together by both a plastic rivet and plastic material between the laminations of the area of the passageway. This is illustrated in FIG. 5 wherein plastic material 13 fills the the hole or passageway 6 and further penetrates between the laminations 1a, 1b, 1c, etc., in the area of the hole 6. Thus, each lamination is stuck to the one adjacent to it as well as being held by plastic rivets.

It will be quite obvious that all the modifications, or any combination thereof, may if desired (but it is not necessary), be combined to form a single core structure, as illustrated in FIG. 2. In other words, the resin can be introduced into special rivet holes according to the first above described modification (as illustrated in FIG. 3) and may, in other rivet holes of the same core be introduced with enough force to cause it to penetrate between the laminations (as illustrated in FIG. 5). In other through holes, excess resin may be blown out after some resin is deposited between the laminations, thereby bonding the core by a layer of resin between the laminations. As to the first described modification wherein the laminations are secured by a plastic rivet, some resin will flow between the laminations due to capillary action or as a result of the aforesaid secondary flow characteristic of the resin during curing; therefore, it is likely that the plastic rivets will not be bonding the lamination alone, but will be working in combination with plastic material between the laminations.

If the lamination stack 1 is of a height greater than that needed for a single finished core, the desired core height may be selected and the stack may be divided into a number of core members of the desired height. Such a stack height selection may be accomplished in any well known method, for example, by slicing. The preparation of stacks of laminations of a length long enough for several cores has the further advantage that after curing and bonding, the lamination stack may be placed in storage or may be used for stack height selection as needed. This results in a reduction of core storage space since the rapidity at which the core height may be selected will permit the storage of lamination stacks only and the actual cores may be constructed by the method according to the invention as production thereof warrants.

It will be readily seen that the disclosed method results in the elimination of core keys and rivets and in the elimination of complex core keying and riveting machines. It results in the use of simple, low cost core height selecting methods and permits the reduction of core storage space. It was found that cores made according to the above described method had have adequate strength for use in the above mentioned electric inductive devices. While the invention has been described specifically with relation to dynamoelectric machine cores, it is to be understood that the invention can be equally practiced with relation to other electric inductive devices, such as the cores of transformers.

In accordance with the Patent Statutes, I have described what at present are considered to be the preferred embodiments of our invention. However, it will be obvious to those skilled in the art that various changes and modifications may be made in the disclosed structure and method without departing from our invention, and it is, therefore aimed in the appended claims to cover all such changes and modifications as fall within the true spirit and scope of our invention.

What we claim as new and desire to secure by Letters Patent of the United States is:

1. The method of forming a core for an electric inductive device of laminations containing holes therein, comprising the steps of stacking a plurality of said laminations with the holes aligned to form at least one passageway therethrough, introducing heat hardenable resinous material into said passageway under pressure so as to force some of said material to penetrate slightly between the laminations and substantially surround said holes, removing substantially all of the resinous material from said passageway, and hardening the remaining of said material to secure the laminations together.

2. The method of forming a core according to claim 1 wherein the stack is of a height greater than that required for one core, and wherein the method includes the step of dividing the stack into cores of proper height after the resinous material has been hardened.

3. A method of forming a laminated stator core having a bore, winding accommodating means, and a plurality of bolt holes extending axially through the core spaced from said means and positioned adjacent the outer periphery of said core, the method comprising the steps: arranging a plurality of individual laminations in juxtaposed, aligned, relation to form the bore, winding accommodating means, and bolt holes; introducing a resinous material in an unhardened state under pressure into at least one of said bolt holes while compressing the laminations together so that the material penetrates between adjacent laminations to surround the bolt holes; removing the unhardened material from the bolt holes whereby the bolt holes may be free to accommodate bolts for mounting the stator core; and hardening the material surrounding the bolt holes between the laminations to hold the laminated stack securely together.

References Cited by the Examiner

UNITED STATES PATENTS

| | | | |
|---|---|---|---|
| 2,256,701 | 9/1941 | Bacon | 264—258 X |
| 2,437,270 | 3/1948 | Peek | 310—217 X |
| 2,483,024 | 9/1949 | Roters | 29—155.53 |
| 2,569,065 | 9/1951 | Lavin | 264—263 X |
| 2,653,208 | 9/1953 | Ballman. | |
| 2,761,078 | 8/1956 | McAdams. | |
| 2,763,032 | 9/1956 | Fay | 264—263 |
| 2,763,916 | 9/1956 | Korski | 29—155.53 |
| 2,820,914 | 1/1958 | Rudoff | 310—43 |
| 2,856,639 | 10/1958 | Forrest et al. | 264—272 |
| 3,016,580 | 1/1962 | Jaeschke | 264—263 |
| 3,045,132 | 7/1962 | Yeoman | 310—43 |

ROBERT F. WHITE, *Primary Examiner.*

MILTON O. HIRSHFIELD, *Examiner.*

J. W. GIBBS, L. S. SQUIRES, T. J. CARVIS,
*Assistant Examiners.*